United States Patent Office 3,219,696
Patented Nov. 23, 1965

3,219,696
β-IONYLIDENE AMINOKETONES AND METHOD OF PRODUCING
Hendrik Evert van Geelen, Weesp, Netherlands, assignor to North American Philips Company, Inc., New York, N.Y., a corporation of Delaware
No Drawing. Filed Apr. 20, 1961, Ser. No. 104,250
Claims priority, application Netherlands, May 6, 1960, 251,314
5 Claims. (Cl. 260—563)

This invention relates to a novel process for producing compounds of the vitamin A series and novel intermediates thereof.

It is known to produce compounds having vitamin A activity, which are characterised by an unsaturated aliphatic-alicyclic hydrocarbon group having the Formula I

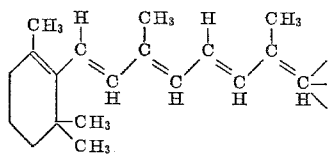

by building up the side chain of the trimethylcyclohexane in a number of steps. In a number of these known syntheses one of the steps is the condensation of β-ionylideneacetaldehyde (Formula II) called here β-$C_{15}$-aldehyde with acetone to produce the so-called β-$C_{18}$-ketone (5-β-ionylidene pent-3-enone-2) (Formula III):

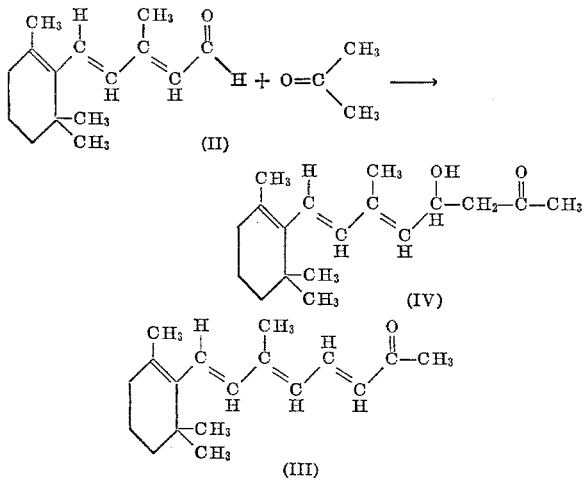

The aldol of the Formula IV formed as an intermediate product is immediately converted to the ketone of the Formula III with dehydration. This $C_{18}$-ketone is converted for example by known methods such as with bromoacetic acid ester in a Reformatsky reaction, into a vitamin A acid ester, or, by condensation with cyano acetic acid or an ester thereof according to Knoevenagel into the vitamin A acid nitrile.

It has been found that the yields of these reactions with β-$C_{18}$-ketone depend upon the purity of the $C_{18}$-ketone used. In each known method of producing the β-$C_{15}$-aldehyde a number of by-products are formed by which, unless this aldehyde is purified, $C_{18}$-ketone produced therefrom is also contaminated. These impurities have a detrimental influence upon the yields of reactions carried out with this ketone and reduce these yields out of proportion to the content of $C_{18}$-ketone.

According to known methods of purifying either the $C_{15}$-aldehyde or the $C_{18}$-ketone, the carbonyl compound is reacted in a solution with a semicarbazide, a thiosemicarbazide or a hydrazine compound, the poorly soluble carbazone or hydrazone being subsequently filtered off and decomposed. These methods are expensive and laborious and again give rise to the formation of by-products.

The principal objects of this invention are to supply a new and improved means of obtaining 5-β-ionylidene pent-3-enone-2 and to prepare novel intermediates for the preparation of said ketone.

These and other objects of this invention will be apparent from the description that follows.

According to the invention the condensation with acetone is not performed with the $C_{15}$-aldehyde but with a $C_{15}$-aldimine, so that a new intermediate product of the vitamin A series is obtained which, after a simple purification, can be directly converted to pure $C_{18}$-ketone. The resultant $C_{18}$-ketone may be used for the formation of compounds having vitamin A activity or of intermediate products for the production of compounds having vitamin A activity.

Quite surprisingly, it has now been found that, if the acetone condensation is not performed with the $C_{15}$-aldehyde but with a corresponding aldimine, the intermediately formed aminoketone (β-$C_{18}$-aminoketone) is sufficiently stable to be isolated in the pure state, even though this aminoketone can be readily decomposed to form β-$C_{18}$-ketone with the splitting off of ammonia or of a primary amine.

These aminoketones can be purified in a very simple manner by forming salts thereof and hence are very suitable as starting materials for the production of pure $C_{18}$-ketone and of compounds having vitamin A activity.

More particularly, according to one aspect of the invention a new compound having the formula:

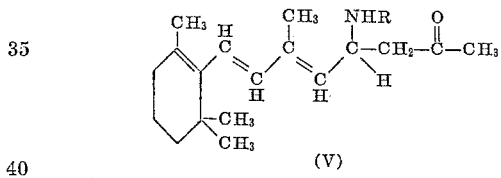

in which formula R is hydrogen or a lower alkyl group of 1–6 carbon atoms, is produced by the reaction of an aldimine of the formula

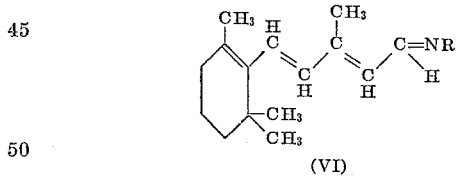

with acetone.

This reaction is preferably carried out by dissolving the aldimine in an excess of acetone and reacting it therewith at a temperature between 0° C. and 50° C.

However, other solvents, such as alcohols or ethers, may be added to the reaction mixture. In order to prevent polymerisation reactions, dilute solutions, for example 2–10% solutions, of the amine are preferably used.

The yield of aminoketone and the reaction velocity may be increased by adding additional ammonia or the corresponding primary amine to this solution.

One embodiment of the reaction is that in which an excess of ammonia or of a primary amine is added to a solution of β-ionylideneacetaldehyde in an excess of acetone. Thus the $C_{18}$-aminoketone of the Formula VI is obtained without intermediate isolation of the intermediately formed aldimine.

Suitable primary amines are lower aliphatic primary amines containing from 1 to 6 carbon atoms, for example methyl-, ethyl-, propyl-, isopropyl-, butyl-, isobutyl- or amyl-amine, because the solubility of the salts of the obtained aminoketones with inorganic acids in organic solvents increases with increase of the aliphatic chain so that the separation of the aqueous solution of such a salt from impurities by extraction with a non-water miscible organic solvent is impeded.

Preferably the unsubstituted β-ionylideneacetaldimine is used, because it has provided excellent results and may be obtained in a simple manner from β-ionylideneacetonenitrile by reduction with a metal hydride or with a metal alkyl hydride.

The purification of the β-aminoketone may be effected by pouring the reaction mixture in a dilute aqueous solution of an inorganic acid, for example sulphuric acid or hydrochloric acid, washing the aqueous solution with a non-water-miscible organic solvent, for example an ether or an aliphatic or aromatic hydrocarbon such as octane, benzene or toluene and preferably petroleum ether, such as diethyl or isopropyl ether since in the latter the salts of the aminoketones with an inorganic acid are least soluble.

It is an important advantage of the method according to the invention over the known production of $C_{18}$-ketone from $C_{15}$-aldehyde with acetone, that the dehydration reaction after the acetone condensation need not be performed in the alkaline condensation medium, as is the case with the aldol condensation, but that after the isolation of the aminoketone the best conditions may be chosen under which the splitting off can be effected without shifting of the double-bond system. These conditions preferably are neutral or acid conditions. However, alkaline conditions may be employed.

This deamination of the aminoketone obtained may be effected in the manner usually employed for these reactions, for example by heating under reduced pressure or by heating in a solution in the presence of an organic acid, for example acetic acid or propionic, n-butyric or formic acids.

In splitting off ammonia from the primary aminoketone, very satisfactory results are also obtained if a substance capable of combining with ammonia and forming a coordination complex is added to the solution of the aminoketone such as $CaCl_2$, $BF_3$ or $CoCl_3$. Suitable solvents are the low-boiling-point solvents, for example ethanol or methanol. By using a dilute solution, for example a 2–10% solution, polymerisation reactions during the deamination are prevented.

After completion of the reaction, the $C_{18}$-ketone obtained may be withdrawn from the mixture by pouring the latter in water, extracting the mixture with a non-water-miscible low boiling point organic solvent, for example, petroleum ether, washing and evaporating the extract.

The highly pure β-$C_{18}$-ketone obtained in this manner may be used to form compounds having vitamin A activity or intermediate products for producing these compounds by known methods.

The invention will now be described in greater detail with reference to the following examples.

Examples (I)

(a) 100 g. of impure β-$C_{15}$-aldehyde containing about 75% of the aldehyde obtained by oxidation of β-$C_{15}$-alcohol with $MnO_2$, were dissolved in 1 litre of acetone, after which $NH_3$ gas was introduced to saturation. After standing for three days at room temperature, the resultant mixture was poured into 1 litre of 2 N $H_2SO_4$ and extracted with petroleum ether (removal of the neutral fraction). The petroleum ether extracts were washed with a mixture of equal parts of 2 N $H_2SO_4$ and acetone. The combined extracted water layer and the aqueous acetone layer were made alkaline with 250 cc. of 33% NaOH and extracted with petroleum ether. The petroleum ether extract was washed with water and then dried by evaporation at a temperature of not in excess of 70° C. Yield of β-$C_{18}$-aminoketone: 92 g.=0.334 mol=72.6%;

$$E^{1\%}_{1cm.} \text{ at } \lambda 270 = 447$$

(b) 8.37 g. of β-$C_{18}$-aminoketone=0.0304 mol was dissolved in 60 cc. of alcohol. The solution was added to a saturated solution of $CaCl_2$ in alcohol and boiled for 1½ hours. The resultant reaction mixture was acidified with acetic acid, poured into water and extracted with petroleum ether. The petroleum ether extract was washed with water and then dried by evaporation. Yield of β-$C_{18}$-ketone: 6.89 g.=0.0266 mol=87.3%; ε at about λ 350=22,900.

(c) 8.37 g. of β-$C_{18}$-aminoketone=0.0304 mol (free base of equivalent weight=277; $E^{1\%}_{1cm.}$ at λ 265=477) obtained from crystalline β-$C_{18}$-amino ketone sulphate (white substance from acid aqueous acetone solution of (a) was dissolved in 300 cc. of alcohol. 2.1 cc. of acetic acid were added and the mixture was boiled for 2 hours. The reaction mixture was worked up in the manner described in (b) with the following result: 7.65 g. of β-$C_{18}$-ketone=0.029 mol=97% with an ε of 25,500 at about λ 350 were obtained.

(II)

9 g. of β-$C_{15}$-aldimine=0.0416 mol $$E^{1\%}_{1cm.} \text{ at about } \lambda 305 = 598$$

obtained by the conversion of β-$C_{15}$-aldehyde (obtained in the manner described in Example I) in a methanolic $NH_3$ solution were dissolved in 30 cc. of an acetonic $NH_3$ solution (about 1 N). After being allowed to stand at room temperature for 2 days, the resultant reaction mixture was poured into water, extracted with petroleum ether and the petroleum ether extract washed with water. After drying by evaporation in a vacuum at 70° C., 11.5 g. of β-$C_{18}$-amino ketone=0.0420 mol=101% were obtained;

$$E^{1\%}_{1cm.} \text{ at } \lambda 270 = 450$$

equivalent weight 386. Conversion into β-$C_{18}$-ketone furnished a product having an ε of 17,100 at λ 350.

(III)

β-$C_{18}$-aminoketone was produced in the same manner as described in Example II. However, the aminoketone reaction mixture was worked up in the manner described in Example I, i.e., it was poured in 2 N aqueous $H_2SO$ and the neutral fraction was then removed by extraction. The purified aminoketone sulphate was converted to the free base and this base was converted into a dry substance, dissolved in 300 cc. of a mixture of acetic acid and alcohol (1:2) and boiled for 2 hours. After working up in the manner described in Example I, 7.55 gms.=0.0291 mol=69.9% of β-$C_{18}$-ketone having an ε of 25,200 at about 350 mμ were obtained.

While I have described my invention in connection with specific embodiments and applications, other modifications thereof will be readily apparent to those skilled in this art without departing from the spirit and scope of the invention as defined in the appended claims.

What I claim is:

1. A β-ionylidene aminoketone of the formula:

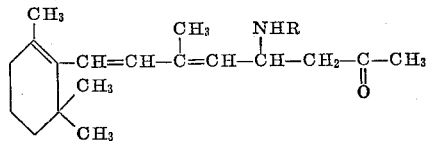

wherein R is a member of the group consisting of hydrogen and alkyl groups containing from 1 to 6 carbon atoms.

2. 5-β-ionylidene-4-amino-pentanone-2.

3. A method of producing a β-ionylidene aminoketone of the formula:

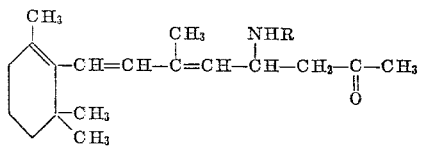

wherein R is a member of the group consisting of hydrogen and alkyl groups containing from 1 to 6 carbon atoms, comprising the step of condensing an aldimine of the formula:

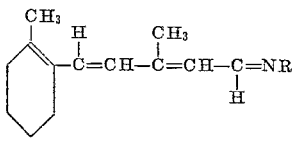

wherein R has the above-stated meaning with an excess of acetone, at a temperature between about 0° C. and 50° C., in the presence of an amino compound of the formula $NH_2R$ wherein R is a member of the group consisting of hydrogen and an alkyl group of 1 to 6 carbon atoms.

4. The method of claim 3 wherein the resultant aminoketone is purified by converting it into the salt of an inorganic acid and then washing this salt with a water-immiscible organic solvent selected from the group consisting of ethers and hydrocarbons.

5. The method of claim 4 wherein the reaction mixture of the aldimine with acetone is introduced into a solution of an organic acid in water and the mixture is extracted with petroleum ether.

References Cited by the Examiner

UNITED STATES PATENTS

| | | | |
|---|---|---|---|
| 2,507,802 | 5/1950 | Milas | 260—563 |
| 2,583,194 | 1/1952 | Weisler | 260—563 |
| 2,736,746 | 2/1956 | Goldberg et al. | 260—563 |
| 2,736,747 | 2/1956 | Goldberg et al. | 260—563 |
| 2,849,490 | 8/1958 | Chase et al. | 260—586 |
| 2,855,405 | 10/1958 | Nichols | 260—563 XR |
| 2,898,375 | 8/1959 | Guex et al. | 260—586 |
| 2,914,560 | 11/1959 | Robertson | 260—566 |
| 2,951,092 | 8/1960 | Sowinski et al. | 260—566 XR |

OTHER REFERENCES

Barbier: "Bull. Soc. Chim. France," 3rd. series, vol. 31, pages 951–955 (1904).

Mayer: "Bull. Soc. Chim. France," 4th series, vol. 19, pages 427–432 (1916).

Karrer et al.: "Helv. Chim. Acta, vol. 33, pages 2202–2208 (1950).

Koslav: "C. A.," vol. 54, page 20977 (1960).

CHARLES B. PARKER, *Primary Examiner.*

LEON ZITVER, *Examiner.*